(12) United States Patent
Braconnier et al.

(10) Patent No.: US 6,419,852 B1
(45) Date of Patent: Jul. 16, 2002

(54) USE AS PHOSPHOR DOT IN A PLASMA OR X-RAY SYSTEM OF A LANTHANUM PHOSPHATE COMPRISING THULIUM

(75) Inventors: Jean-Jacques Braconnier, Lagord; Denis Huguenin, Asnieres-sur-Seine; Claude Ceintrey, Marly-le-Roi, all of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/530,090
(22) PCT Filed: Oct. 23, 1998
(86) PCT No.: PCT/FR98/02275
§ 371 (c)(1), (2), (4) Date: Jul. 3, 2000
(87) PCT Pub. No.: WO99/21938
PCT Pub. Date: May 6, 1999

(30) Foreign Application Priority Data

Oct. 24, 1997 (FR) .............................................. 97 13367

(51) Int. Cl.$^7$ ................................................ C09K 11/81
(52) U.S. Cl. ................................ 252/301.4 P; 423/263; 423/311
(58) Field of Search .................... 252/301.4 P; 423/263, 423/311

(56) References Cited

U.S. PATENT DOCUMENTS

| 5,156,764 A | * 10/1992 | Kaneda et al. ........ 252/301.4 P |
| 5,743,955 A | 4/1998 | Phillips .......................... 117/2 |
| 5,989,454 A | * 11/1999 | Rao ..................... 252/301.4 P |

FOREIGN PATENT DOCUMENTS

| EP | 0 376 339 | 7/1990 |

* cited by examiner

*Primary Examiner*—C. Melissa Koslow

(57) ABSTRACT

The present invention relates to the use of a compound based on a thulium-containing lanthanum phosphate as a phosphor in a plasma or X-ray system. This phosphate may furthermore contain gadolinium. The thulium content of the compound, expressed in at % with respect to the lanthanum, is between 0.1 and 10, more particularly between 0.5 and 5. The invention also covers a lanthanum phosphate which is characterized in that it contains thulium and in that it consists of particles having a mean size of between 1 and 20 $\mu$m with a dispersion index of less than 0.6.

18 Claims, No Drawings

USE AS PHOSPHOR DOT IN A PLASMA OR X-RAY SYSTEM OF A LANTHANUM PHOSPHATE COMPRISING THULIUM

This application is an application under 35 U.S.C. Section 371 of International Application Number PCT/FR98/02275 filed on Oct. 23, 1998.

The present invention relates to the use of a compound based on a thulium-containing lanthanum phosphate as a phosphor in a plasma or X-ray system.

Plasma systems (screens and lamps) form part of novel display and illumination techniques which are in the process of undergoing development. One specific example is that of the replacement of current television screens with flat screens which are lighter and larger in size, which replacement is on the point of being solved by the use of plasma panels.

In plasma systems, a gas introduced into an enclosure is ionized due to the effect of an electrical discharge. During this process, high-energy electromagnetic radiation is emitted. The photons are directed onto a luminescent material.

Likewise, in systems involving X-rays, the photons excite a luminescent material.

In order to be effective, this material must be a phosphor absorbing in the plasma or X-ray emission range and emitting in the suitable spectral range with as high a yield as possible.

Now, there is a need for a phosphor that can be used in plasma and X-ray systems, emitting in the blue.

The object of the invention is to provide such a phosphor material.

For this purpose, according to the invention, a compound based on a thulium-containing lanthanum phosphate is used as a phosphor in a plasma or X-ray system.

The invention also relates to a plasma or X-ray system, characterized in that it comprises the aforementioned compound as a phosphor.

The invention also covers a lanthanum phosphate which is characterized in that it contains thulium and in that it consists of particles having a mean size of between 1 and 20 $\mu$m with a dispersion index of less than 0.6.

Finally, the invention relates to a phosphor having the same characteristics as those given above in the case of the phosphate.

Further features, details and advantages of the invention will appear even more fully upon reading the following description, as well as from the various specific but non-limiting examples intended to illustrate it.

The invention is based on the discovery of the luminescence properties of certain phosphates with respect to plasma radiation or X-radiation. The invention therefore firstly relates to the use of the compound described above as a phosphor under conditions which are those of plasma systems. This, for the present description, should be understood to mean all systems using a gas which emits, after ionization, radiation corresponding to at least wavelengths lying between 100 and 200 nm, more particularly between 140 and 200 nm, that is to say the far ultraviolet range.

As systems of this type, mention may be made of plasma screens and lamps.

The phosphor of the invention can also be used in systems using X-rays. X-rays should be understood to mean here, for the present description, photons whose energy is between 10 and 100 kev.

As X-ray systems, mention may be made of imaging systems, especially medical imaging systems.

The phosphor of the invention is a compound comprising a matrix of the LaPO$_4$ type. This phosphate furthermore contains thulium as a dopant. Thulium is present in the phosphate in a trivalent form.

This phosphate, excited by radiation of the plasma or X-ray type, emits in the blue.

This phosphate may furthermore contain gadolinium as a codopant.

In general, the thulium content, expressed in at % with respect to the lanthanum, is between 0.1 and 10, more particularly between 0.5 and 5.

The gadolinium content, expressed in at % with respect to the lanthanum, may vary between 10 and 40%.

According to a preferred embodiment of the invention, a lanthanum phosphate consisting of particles having a mean size of between 1 and 20 $\mu$m with a dispersion index of less than 0.6 is used.

The particle size may more particularly be between 2 and 6 $\mu$m. The dispersion index may more particularly be at most 0.5.

Throughout the description, the particle size and size distribution analysis characteristics are measured by a sedimentation technique using a particle size analyzer of a Sedigraph type. The measurement is conventionally carried out on an aqueous dispersion of the product which is treated by ultrasonic deagglomeration (5 minutes, 120 watts).

The term "dispersion index" should be understood, to mean the ratio:

$$\sigma/m = (d_{84} - d_{16})/2d_{50}$$

in which $d_{84}$ is the particle diameter for which 84% of the particles have a diameter of less than $d_{84}$;

$d_{16}$ is the particle diameter for which 16% of the particles have a diameter of less than $d_{16}$;

$d_{50}$ is the mean diameter of the particles.

The invention also relates to plasma or X-ray systems or devices which comprise a phosphor compound as described above. All of the characteristics that were given above with regard to the phosphor compound and the phosphate also apply here to the description of the systems or devices. These characteristics will therefore not be repeated here.

The invention also relates to the use of the phosphor compound in the manufacture of these systems or devices. This use is accomplished using well-known techniques, for example by screen-printing deposition, electrophoresis or sedimentation.

The invention relates moreover, by way of novel product particularly suitable for use, as described above, as a phosphor, to a specific lanthanum phosphate as well as to its method of preparation.

The method of preparation will firstly be described.

This method consists in producing a direct precipitation at a controlled pH by making a first solution, containing soluble salts of rare earths (lanthanum, thulium and, where appropriate, gadolinium salts), these elements then being present in the required stoichiometric proportions for obtaining the product of the desired formula, react with a second solution containing phosphate ions.

The solution of soluble rare-earth salts is introduced into the solution containing the phosphate ions. In general, the salt solution is introduced into the phosphate-ion solution gradually and continuously.

The initial pH of the solution containing the phosphate ions is less than 3, and preferably between 1 and 3.

The pH of the precipitation medium is then controlled to a pH value of less than 2, and preferably between 1 and 2. If the initial pH of the solution containing the phosphate ions is greater than 3, introduction of the solution of rare-earth salts causes a reduction in the pH value of the reaction mixture formed by mixing this solution with the initial phosphate-ion solution. In this case, the pH value is left to drop to a value of less than 2 and once the desired pH value has been achieved it is this value that is controlled.

The expression "controlled pH" should be understood to mean maintaining the pH of the precipitation medium at a certain constant, or approximately constant, value by the addition of basic compounds or of buffer solutions to the solution containing the phosphate ions, this being done simultaneously with the introduction into the latter of the solution containing the soluble rare-earth salts. The pH of the medium will thus vary by at most 0.5 pH units about the fixed set value, and more preferably by at most 0.1 pH units about this value.

Advantageously, this pH control is achieved by the addition of a basic compound, as will be explained below.

The precipitation is preferably carried out in an aqueous medium at a temperature which is not critical and advantageously lies between room temperature (15–25° C.) and 100° C. This precipitation takes place while the reaction mixture is being stirred.

The concentrations of the rare-earth salts in the first solution may vary over wide limits. Thus, the total concentration of rare earths may be between 0.01 mol/liter and 3 mol/liter.

The rare-earth salts that are suitable are in particular those which are soluble in an aqueous medium, such as, for example, nitrates, chlorides, acetates and carboxylates, or a mixture of these salts. According to the invention, the preferred salts are nitrates.

The phosphate ions intended for reacting with the solution of rare-earth salts may be provided by pure compounds or compounds in solution, such as, for example, phosphoric acid, alkali metal phosphates or phosphates of other metallic elements giving, together with the anions associated with the rare earths, a soluble compound.

According to a preferred embodiment, the phosphate ions are added in the form of ammonium phosphates since the ammonium cation will decompose during the subsequent calcining, thus making it possible to obtain a lanthanum phosphate of high purity. Among ammonium phosphates, diammonium or monoammonium phosphate are the preferred compounds for implementing the invention.

The phosphate ions are present in an amount such that there is, between the two solutions, a $PO_4$/rare earths molar ratio of greater than 1 and advantageously between 1.05 and 3.

As indicated above, the solution containing the phosphate ions must have initially, that is to say before the solution of rare-earth salts starts to be introduced, a pH of less than 3 and preferably between 1 and 3.

Consequently, the pH of the reaction mixture is controlled, as described above, by simultaneously adding a base to this mixture.

As suitable basic compound, mention may be made, as examples, of metal hydroxides (NaOH, KOH, $Ca(OH)_2$, etc.) or ammonium hydroxide, or any other basic compound, whose constituent species will not form any precipitate, upon adding them to the reaction mixture, by them combining with one of the species already contained in this mixture, allowing the pH of the precipitation medium to be controlled.

After the precipitation step, a phosphate precipitate is obtained directly, which can be recovered by any means known per se, particularly by simple filtration. Next, the recovered product may be washed, for example with water, for the purpose of stripping it of any impurities, especially of adsorbed nitrate and/or ammonium groups. Finally, it may be heat treated under various conditions, essentially chosen on the desired degree of conversion for the final product (nature of the crystal phase, degree of hydration, purity, level of luminescence, etc.), as will be explained in greater detail below. With or without the use of subsequent heat treatments, it should be pointed out that the method according to the invention always leads to products having a fine and extremely tight particle size distribution.

This $LaPO_4$ phosphate, which includes thulium as a dopant, consists of particles having a mean size of between 1 and 20 $\mu$m with a dispersion index of less than 0.6. The particle size may more particularly be between 2 and 6 $\mu$m. The dispersion index may more particularly be at most 0.5.

This phosphate may furthermore contain gadolinium as a codopant. The thulium content and, optionally, the gadolinium content, are those given above.

This thulium-doped lanthanum orthophosphate may have a crystal habit either of the hexagonal type or of the monoclinic type, this essentially depending on the temperature to which the product is subjected during its preparation. Thus, more specifically, the hexagonal habit corresponds to the phosphate that has either undergone no subsequent heat treatment or has undergone a heat treatment but at a temperature generally not exceeding 600° C., and the monoclinic habit corresponds to the phosphate which is obtained after a strong heat treatment carried out a temperature at least greater than 600° C., advantageously between 700 and 1000° C., for the purpose of converting the hexagonal crystal phase into a pure monoclinic phase.

A product which is not heat treated is generally hydrated; however, simple drying operations carried out, for example, between 60 and 100° C. are sufficient to remove most of this residual water, the minor amounts of water remaining themselves being removed by calcining operations carried out higher temperatures, greater than approximately 400° C.

Likewise, the thulium-doped lanthanum phosphate of the invention has a specific surface area which varies depending on the calcining temperatures to which it is heated, the said specific surface area decreasing uniformly with these temperatures. Thus, by way of example, after a heat treatment at a temperature of less than 600° C., it has a specific surface area of greater than or equal to 30 $m^2$/g; after calcining at 800° C., this surface area is of the order of ten $m^2$/g approximately and, after calcining at 900–1000° C., it drops to values of generally less than approximately 5 $m^2$/g.

In the above, the specific surface area is measured by the BET method, that is to say determined by nitrogen adsorption according to the ASTM D3663-78 standard drawn up on the basis of the Brunauer-Emmett-Teller method described in the journal "The Journal of the American Society", 60, 309 (1938).

The thulium-doped lanthanum phosphate of the invention furthermore has the particularly remarkable and useful property of not clumping during the calcining, that is to say the particles of which it is composed do not agglomerate, or do not have a tendency to agglomerate and therefore to be in a final form consisting of coarse granules having a size ranging from 0.1 to several mm, for example; it is thus unnecessary to pregrind the powders before carrying out on them the conventional treatments intended for obtaining the final phosphor.

Although the lanthanum phosphate according to the invention, after it has been subjected to a heat treatment at a temperature generally greater than 600° C. and advantageously between 700 and 1000° C., exhibits luminescence properties, it may prove necessary to further improve these luminescence properties by carrying out post-treatments on the product so as to obtain an actual phosphor that can be used directly as such in the desired application. Of course, the boundary between a simple lanthanum phosphate and an actual phosphor remains, when all is said and done, quite arbitrary and depends on the single luminescence threshold based on which it may be regarded that a product can be directly used in a acceptable manner by a user. In the present case, and quite generally, a thulium-doped lanthanum phosphate according to the invention which has not been subjected to heat treatments greater than approximately 1000° C. may be regarded and identified as a phosphor precursor, since such a product generally exhibits luminescence properties that may be deemed as not satisfying the minimum brightness criterion of commercial phosphors that can be directly used as such, without any subsequent conversion. On the other hand, a lanthanum phosphate which, possibly after having been subjected to suitable treatments, does develop suitable brightnesses sufficient for it to be used directly by a user in plasma or X-ray systems may be termed a phosphor.

Thus, in order to further develop its luminescence properties, the thulium-doped lanthanum phosphate of the invention may be subjected to a heat treatment in the presence of a flux. It will be noted that such treatment is in itself already well known per se and is conventionally used in the methods for producing the main phosphors, especially in order to adapt the latter to the desired application (brightness and surface finish, for example).

By way suitable fluxes, mention may in particular be made of lithium fluoride, lithium chloride, potassium chloride, ammonium chloride, boron oxide and ammonium phosphates, this list being, of course, in no way exhaustive. The flux is mixed with the phosphate to be treated and then the mixture is heated to a temperature of at least 1000° C., generally between 1000° C. and 1200° C., in a necessarily reducing atmosphere. After the treatment, the product is washed and then rinsed, so as to obtain a phosphor which is as pure as possible and in an unagglomerated state.

In other cases, the product may also be simply heat treated at a temperature of at least 1000° C., generally between 1000 and 1200° C., but in the absence of any flux. Whichever of the above processes is used, a phosphor based on thulium-doped, and optionally gadolinium-codoped, lanthanum phosphate, having a mean particle size of between 1 and 20 microns, preferably between 2 and 6 microns, and with a very low dispersion index, of less than 0.5 and preferably at most 0.4, is finally always obtained.

This phosphor has a monoclinic-type crystal structure.

The thulium content and, optionally, the gadolinium content are those given above in the case of the phosphate.

Examples will now be given.

EXAMPLE 1

This example relates to the preparation of phosphates and of phosphors according to the invention with various thulium contents.

Firstly, a phosphate of formula $La_{0.999}Tm_{0.001}PO_4$ is prepared. Added over 1 hour to a stirred stock, consisting of 1.34 l of a 1.1 M/l phosphoric acid solution preneutralized to a pH of 1.6 by an aqueous ammonia solution and heated to 60° C., is 0.55 l of a 2.2 M/l solution of rare-earth nitrates, while maintaining the temperature of the mixture as well as its pH by the addition of aqueous ammonia.

Once the addition has been completed, the precipitate is filtered off and then washed with cold demineralized water. The cake obtained is then calcined at 900° C. for 2 hours.

The powder obtained has a monoclinic crystallographic structure and a mean diameter of 5 μm with a dispersion index of 0.4.

After adding LiF (1% by weight), the precursor is converted into a phosphor by a heat treatment at 1000° C.

Phosphates and phosphors having the thulium content indicated in Table 1 below are prepared in the same way by adding the stoichiometric amounts of nitrates. The products obtained have the same particle-size and crystallographic characteristics as the above phosphate.

EXAMPLE 2

The intensity of the X-ray-excited $Tm^{3+}$ emission peak in the blue located at 450 nm of the phosphors prepared in Example 1 was measured as a function of the thulium content. The results are given below.

TABLE 1

| Tm (at %) | Emmission intensity (arbitrary units) |
|---|---|
| 0.1 | 88 |
| 0.4 | 130 |
| 0.5 | 160 |
| 2 | 125 |
| 5 | 95 |

In the absence of thulium, no emission is observed under the same excitation conditions.

EXAMPLE 3

The product with a thulium content of 0.5 at % was evaluated in a plasma-screen test cell containing a xenon-neon gas. Blue light emission characteristic of trivalent thulium was observed.

What is claimed is:

1. A plasma or X-ray system, comprising a compound based on a thulium-containing lanthanum phosphate matrix of formula $LaPO_4$ as a phosphor.

2. A system according to claim 1, wherein the compound futhermore contains gadolinium.

3. A system according to claim 1, wherein the thulium content of the compound, expressed in atomic percentage (at %) with respect to the lanthanum, is between 0.1 and 10.

4. A system according to claim 3, wherein the thulium content is between 0.5 and 5.

5. A system according to claim 1, wherein the lanthanum phosphate comprises particles having a mean size of between 1 and 20 μm with a dispersion index of less than 0.6.

6. A lanthanum phosphate matrix of formula $LaPO_4$, containing thulium and comprising particles having a mean size of between 1 and 20 μm with a dispersion index of less than 0.6.

7. A lanthanum phosphate matrix of formula $LaPO_4$, containing thulium and comprising particles having a mean size of between 1 and 20 μm with a dispersion index of less than 0.6, further containing gadolinium.

8. A phosphate according to claim 6, wherein the thulium content, expressed in atomic percentage (at %) with respect to the lanthanum, is between 0.1 and 10.

9. A phosphate according to claim 8, wherein the thulium content is between 0.5 and 5.

10. A phosphate according to claim 6, wherein the particles have a dispersion index of at most 0.5.

11. A phosphor based on a lanthanum phosphate matrix of formula $LaPO_4$, containing thulium and comprising particles having a mean size of between 1 and 20 μm with a dispersion index of less than 0.6.

12. A phosphor based on a lanthanum phosphate matrix of formula $LaPO_4$, containing thulium and comprising particles having a mean size of between 1 and 20 μm with a dispersion index of less than 0.6, further containing gadolinium.

13. A phosphor according to claim 11, wherein the particles have a dispersion index of at most 0.5.

14. A phosphor accoridng to claim 11, wherein the thulium content, expressed in atomic percentage (at %) with respect to the lanthanum, is between 0.1 and 10.

15. A phosphor according to claim 14, wherein the thulium content is between 0.5 and 5.

16. A method for the preparation of a lanthanum phosphate matrix of formula $LaPO_4$, containing thulium and comprising particles having a mean size of between 1 and 20 μm with a dispersion index of less than 0.6, comprising the steps of:

a) adding a first solution, containing soluble lanthanum, and thulium salts, into a second solution containing phosphate ions and having an initial pH of less than 3, to form a precipitation medium while controlling, during the precipitation, the pH of the precipitation medium to a substantially constant value of less than 2 in order to obtain a precipitate, and, then, b) recovering the precipitate thus obtained in step a).

17. A process according to claim 16, further comprising after step b):

c) heat treating the precipitate obtained in step b).

18. A process according to claim 17, wherein the heat treatment of step c) comprises a calcination at a temperature of at least 1000° C.

* * * * *